Jan. 12, 1971 G. W. MOSS 3,554,703

ANALYTICAL STEP INDICATOR BOARD

Filed May 29, 1968 2 Sheets-Sheet 1

INVENTOR:
Graham William Moss
By Alexander Nowell
ATTORNEYS

INVENTOR:
Graham William Moss
By Alexander & Dowell
attorneys

United States Patent Office 3,554,703

Patented Jan. 12, 1971

3,554,703

ANALYTICAL STEP INDICATOR BOARD

Graham William Moss, 20 Parkstead Road, London, England

Filed May 29, 1968, Ser. No. 732,914
Int. Cl. G01n *31/02*; G09b *23/24*
U.S. Cl. 23—253 9 Claims

ABSTRACT OF THE DISCLOSURE

A board for instruction in the principles of chemical analysis and having a series of apertures labelled with instructions and arranged in groups to define the various stages of the analysis. In a preferred embodiment, the instructions are provided on a washable card apertured similarly to the board and removable therefrom so as to enable the card to be changed or to enable the board to be used without the instructions.

Figure 1:
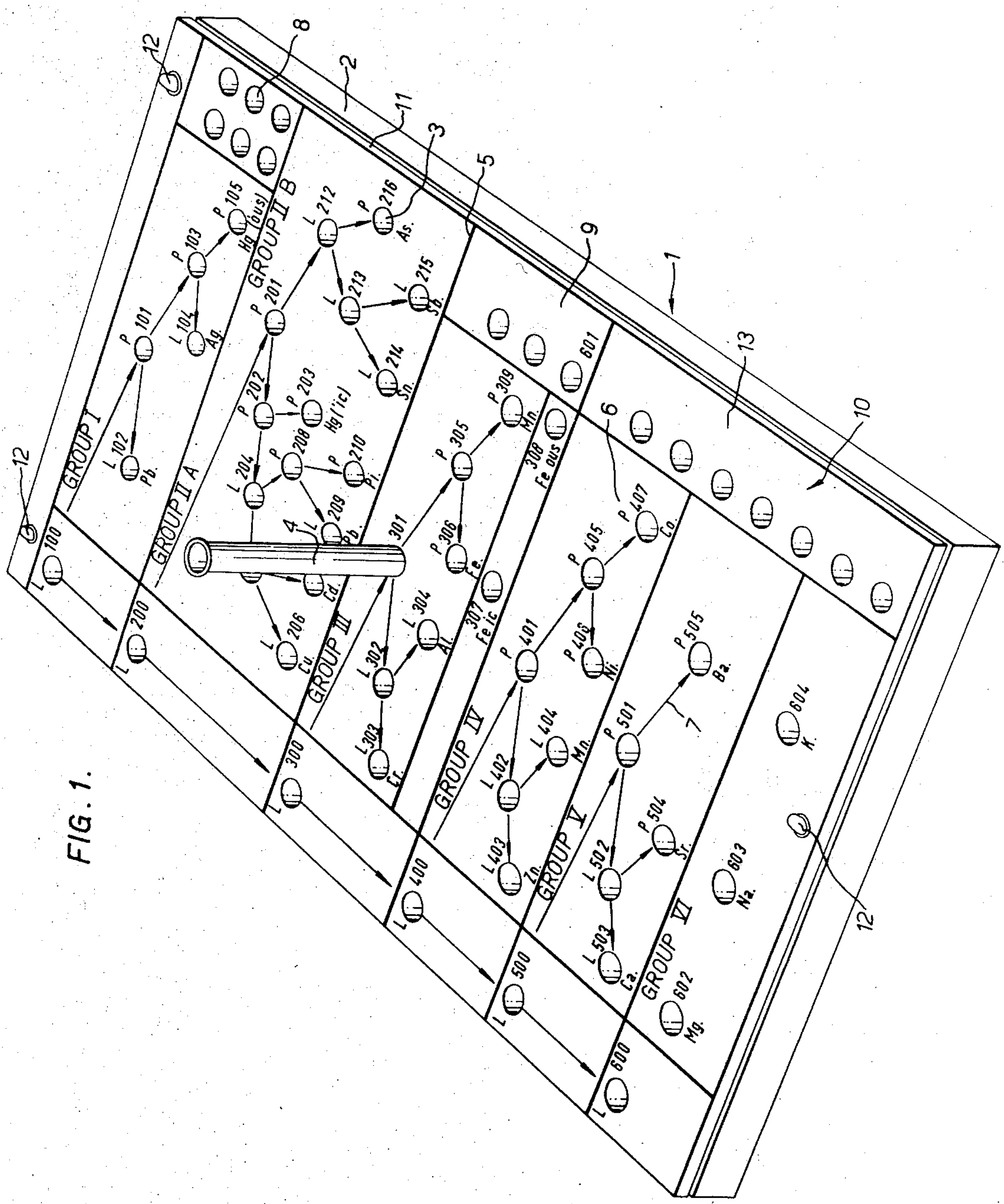
Figure 2:
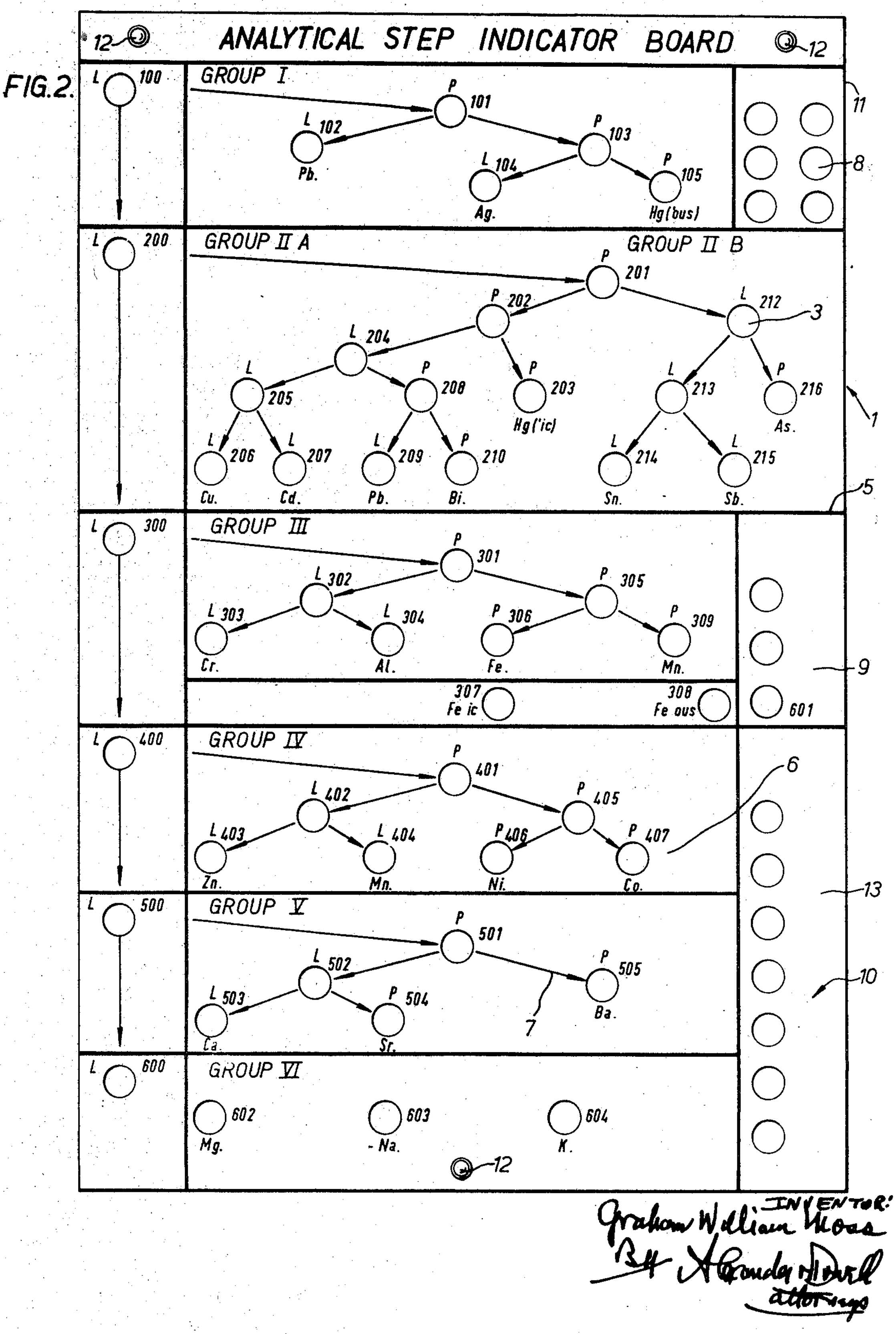

This invention relates to an analytical step indicator board.

Many schemes are known for the analysis of an inorganic compound to determine the anions present. These all consist of subjecting a solution of the compound to a predetermined sequence of reagents so that each anion is deposited as a precipitate at a characteristic stage in the sequence. Where a group of anions are precipitated by one reagent, the precipitate is further reacted so that the anions are characteristically resolved. On this basis, most schemes involve five groups of precipitates plus a sixth group of remaining unprecipitated anions. Thus Group I comprises chlorides which are insoluble in acid solutions; Group II comprises sulphides which are insoluble in acid solutions; Group III comprises insoluble hydroxides; Group IV comprises sulphides insoluble in alkaline solution; Group V comprises the insoluble carbonates, and Group VI comprises the anions of magnesium, sodium, potassium and the ammonium ion. Group II is usually further subdivided into Group II-A—metals not forming thiosalts, and Group II-B—metals forming soluble thiosalts.

It can be seen that any such scheme consists essentially of a continually bifurcating sequence of liquid/precipitate formation and it is clear that only one "branch" can be dealt with by an operative at any one time in the sequence.

It is also usual practice to carry out a number of preliminary tests and tests for acid radicals by the detections of gases evolved, the tests being carried out on small quantities of the original substance. The further explicit tests are then carried out for positive proof of the acid radicals suspected to be present.

It is an object of the present invention to provide a means for retaining the identity of compounds obtained in the course of a selected scheme so that the compounds obtained at each stage do not get lost and so that the stages reached by these compounds are not forgotten.

It is a further object to provide a means for indicating, when a given stage is reached, the possible identity of, and/or further instructions relating to the compound obtained.

It is a further object to provide a means for indicating to an instructor, when the boards of the present invention are being used by students, the progress of each student.

It is a further object of the present invention to provide a means for retaining samples of compounds obtained at each stage of a scheme so that results can be checked at each stage. Furthermore it is an object of the present invention to provide a means for indicating, at each stage of a scheme, only information relevant to that stage so that substantially unskilled operatives can be used for complicated schemes of analysis and/or examinations of materials without their being confused by excessive amounts of information.

It is a further object of the present invention to provide an analytical step indicator board with a top-sheet, onto which the information is marked, which is removable for student-examination purposes, to substitute a different scheme or to replace a worn-out top sheet with a new one.

According to the present invention, there is provided an analytical step indicator board for indicating the stages reached in the investigation of a substance according to a sequential scheme, comprising a substantially rigid member having a plurality of container-retainers, the container-retainers being arranged in a plurality of groups, the groups being divided off from each other by markings on the member, each container-retainer being labelled, either by virtue of its position or by means of further markings on the member, to indicate a stage in the scheme; the arrangement being such that, in operation, when a container, containing substrate, is placed into the container, containing substrate, is placed into the container-retainer corresponding to the stage in the scheme sequence that has been reached by the substrate, the further markings on the member indicate the possible identity of the substrate and/or the further steps of the sequence necessary to reach the next stage in the scheme.

For a better understanding of the invention and to show how the same may be carried into effect in relation to a scheme for the sequential analysis of common metals, reference will now be made, by way of example, to the accompanying drawings in which:

FIG. I is an exploded, perspective view of the board with a test tube in position; and FIG. II is a plan view of the top surface of the board.

In the drawings, the board 1 is made of a base-element 2 of wood with holes 3 drilled in the top surface of the base-element and a top sheet 11 which is supplied with corresponding holes. The base-element 2 and top sheet 11 are removably fitted together by means of press-locking studs 12 which engage in keeper means in the base-element. The holes 3 are big enough to hold a semimicro (e.g., S.W.W. rim 10 x 75 mm.) test tube 4.

The top surface of the board is divided up by group divisions 5, and holes 3 within the groups have labellings 6 which indicate the possible identity of the compound which has reached that stage and/or instructions for the next step in the scheme sequence. The flow path of the scheme is indicated by arrows 7.

For the sake of clarity, each of the labellings has been specifically labelled by a three-figure number, e.g., 100, and those labels are explained below, but it should be understood that in the actual embodiment, the labels are written in full beside their respective holes. In the labels, the letter L denotes that the substrate should be liquid, and the letter P denotes that the substrate should be a precipitate. The top sheet 11 bears on its upper surface markings which divide the top sheet into nine apertured sections. A first section comprises holes 8 which are provided for initially storing the test solution or solutions, for the purpose of repeat analysis and then for confirmatory tests. In a second section there are holes 9 for preliminary tests on the original compound and in a third section there are holes 13 for retaining solutions used for the detection of acid radicals. The remaining six sections are labelled for use in the sequential analysis of a series of anion groups.

In order to protect the markings from reagents, the sheet 11 is covered with a layer 10 of light-transparent reagent-resistant plastics material which is impervious to liquid and thus can be washed clean of spilt chemicals.

For ease of manufacture, it might be preferable to print the divisions 5 and labellings 6 onto a sheet of paper or the like, which, by means of adhesives material, may be applied to the surface of a sheet of wood or the like.

In operation, the original substance is, if a solid, dissolved according to the scheme and a solution of the compound to be analysed is placed in a test tube at hole 100 which commences Group I. This hole is labelled "L.ADD HCl." Hydrochloric acid is added to the liquid and then the test tube is centrifuged to separate the liquid from any precipitate. The liquid is tapped off into a test tube at 200 and the test tube of precipitate is placed in the hole 101.

Hole 101 is labelled "P.ADD WATER AND BOIL." Water is added to the precipitate and boiled and centrifuged. The liquid is placed at hole 102 and the precipitate at hole 103. Hole 102 is labelled "L.ADD KI SOLN. YELLOW PPT. Pb." Thus potassium iodide solution is added to the liquid; if a yellow precipitate is formed, lead is present in the original compound. Hole 103 is labelled "P.ADD $NH_4OH$." Thus ammonium hydroxide is added and centrifuged and the liquid placed at hole 104 and the precipitate at hole 105. Hole 104 is labelled "L.ADD D.$HNO_3$. WHITE PPT. Ag." Thus dilute nitric acid is added and if a white precipitate is formed, silver is present. Hole 105 is labelled "P.BLACK PPT.Hg(ous)" indicating that if there is black precipitate, monovalent mercury (mercurous) is present in the original compound.

Hole 200 which commences GROUP II is labelled "L.PASS $H_2S$ THROUGH WARM SOLUTION." When this is effected and the liquid centrifuged, the precipitate is placed in hole 201 and the liquid in hole 300.

Hole 201 is labelled "P.HEAT WITH $(NH_4)_2$ Sx IN CRUCIBLE." Thus the precipitate is emptied into a crucible and heated with ammonium sulphide, returned to a test tube, centrifuged, and the liquid placed at hole 212 and the precipitate at hole 202.

Hole 202, which commences GROUP II–A, is labelled "P.ADD C.$HNO_3$." This instruction is effected and the mixture centrifuged, the liquid going to hole 204 and the precipitate to hole 203. Hole 203 is labelled "P.ADD C.HCl+TRACE $KClO_3$. BOIL.ADD $SnCl_2$ WHITE PPT TURNING GREY. Hg (ic)." Thus, when concentrated hydrochloric acid and a trace of solid potassium chlorate is added to the precipitate, the formation of a white precipitate turning grey indicates the presence of divalent mercury (mercuric). Hole 204 is labelled "L.ADD $NH_4OH$." This is effected and the mixture centrifuged with the liquid going to hole 205 and the precipitate to hole 208. The liquid at hole 205 (labelled L) is divided into two equal portions and placed at holes 206 and 207. Hole 206 is labelled "ADD HAc.+$K_4Fe(CN)_6$. RED-BROWN PPT. Cu." Thus acetic acid and potassium ferrocyanide are added to the liquid. If a red/brown precipitate results copper is present. Hole 207 is labelled "IF Cu PRESENT ADD KCN. PASS $H_2S$.YELLOW PPT.Cd." Thus potassium cyanide is added only if copper was present, and hydrogen sulphide is passed through the solution. If a yellow precipitate results, cadmium is present. Hole 208 is labelled "P.ADD NaOH." Thus sodium hydroxide is added and residual precipitate centrifuged, and the liquid placed at hole 209 and the precipitate at hole 210. Hole 209 is labelled "ADD HAc.+$K_2CrO_4$. YELLOW PPT. Pb." Thus if, when acetic acid and potassium chromate are added, a yellow precipitate is formed, lead is present. Hole 210 is labelled "ADD NaOH+$SnCl_2$, BLACK PPT.Bi." Thus if, when sodium hydroxide and stannous chloride are added to the precipitate, a black precipitate is formed, bismuth is present.

Hole 212, which commences Group II–B, is labelled "L.ADD D.HCl WASH PPT. ADD C.HCl, BOIL." Thus, firstly, dilute hydrochloric acid is added to the liquid to form a precipitate which is centrifuged, washed and centrifuged again. Secondly, concentrated hydrochloric acid is added to this precipitate which is then boiled and centrifuged, the liquid being placed at 213 and the precipitate going to hole 216. The portion of liquid at 213 (labelled L) is divided and placed at holes 214 and 215. Hole 214 is labelled "L.ADD PIECE Fe WIRE. REMOVE AFTER 7 MINUTES. ADD $HgCl_2$.WHITE PPT.Sn." Thus if these instructions are effected and a white precipitate results, tin is present. Hole 215 is labelled "L.ADD NaOH. ADD SOLID OXALIC ACID. WARM. PASS $H_2S$.ORANGE PPT.Sb." Thus if these instructions are effected and an orange precipitate is formed, antimony is present. Hole 216 is labelled "P.ADD $(NH_4)_2CO_3$. BOIL. ADD D. HCl. YELLOW PPT.As." Thus if ammonium carbonate is added to the precipitate, boiled and dilute hydrochloric acid added, a yellow precipitate indicates the presence of arsenic.

Hole 300 commences Group III but it is necessary to remove any phosphate ions which may be present before the liquid can be further analysed for anions. Accordingly, the position immediately above Hole 300 is labelled "TEST IF $PO_4'''$PRESENT. REMOVE BEFORE STARTING GROUP III."

The presence of phosphate can be determined by removing a small portion of the liquid at hole 300 and placing it in a spare tube retained for confirmatory tests. To this tube is added concentrated nitric acid and then 5 drops of ammonium molybdate. The solution is now warmed and a canary yellow precipitate will form if phosphate is present in the solution. If phosphate is present, it can be removed by the addition of a freshly prepared solution of stannic chloride. The experimental procedure is as follows:

The filtrate from Group II, after boiling to remove hydrogen sulphide, is diluted and ammonium hydroxide solution slowly added until the precipitate which forms does not completely dissolve on shaking; the solution is then neutralised with dilute hydrochloric acid. This solution is boiled and stannic chloride solution added. The precipitate is centrifuged and more stannic chloride solution is added. When no further precipitate is formed, after centrifuging, the liquid is placed in another tube and the precipitate rejected. The liquid is acidified with dilute hydrochloric acid and the excess stannic chloride removed as stannic sulphide by passing hydrogen sulphide through the solution, centrifuging, and the centrifuged liquid thus obtained positioned at hole 300; the precipitate is rejected.

Hole 300 is labelled "L.$PO_4'''$ ABSENT. BOIL IN CRUCIBLE. CHECK ALL $H_2S$ REMOVED. ADD Br WATER. REDUCE VOLUME BY BOILING.+SOLID $NH_4Cl$. TRANSFER TO TUBE.+$NH_4OH$."

Thus if phosphate ions were absent or have now been removed by the previous procedure, the instructions at hole 300 are effected and the centrifuged liquid which is obtained as a result of these instructions is positioned at hole 400 and the precipitate at hole 301.

Hole 301 is labelled "P.HEAT WITH $Na_2O_2$ IN CRUCIBLE." When these instructions have been effected, the centrifuged liquid is placed at hole 302 (labelled L) and further divided and placed at holes 303 and 304.

Similarly, the precipitate is placed at hole 305 (labelled P) divided and placed at holes 306 and 309. Hole 303 is labelled "ADD HAc+1 DROP $PbAc_2$ SOLN. YELLOW PPT.Cr," i.e., if as a result of adding acetic acid plus one drop of lead acetate solution, a yellow precipitate is obtained, chromium is present. Hole 304 is labelled "L.ADD 1 DROP ALIZARIN-S SOLN.+SOLID $NH_4Cl$. WARM.RED PPT.Al." Thus if these instructions are followed and a red precipitate results therefrom, aluminum is present.

Hole 306 is labelled "P.DISSOLVE IN

D.HCl+$K_4Fe(CN_6)$

BLUE-BLACK PPT.Fe." Thus if these instructions are followed and a blue-black precipitate results therefrom, iron is present. It is convenient at this stage to further determine from the original solution whether the iron ion is present in its di- or tri-valent stage, accordingly, there are provided two further holes 307 and 308. This section is labelled "IRON: "TAKE ORIGINAL SUBSTANCE DISSOLVED IN D.HCl AND DIVIDE INTO TWO PORTIONS." Hole 307 is further labelled "ADD $K_4Fe(CN)_6$ BLUE-BLACK PPT.-FERRIC" and hole 308 is labelled "ADD $K_3Fe(CN)_6$BLUE-BLACK PPT.-FERROUS," i.e., the addition of solutions of potassium ferrocyanide and potassium ferricyanide to samples of the original compound in a solution of dilute hydrochloric acid determines the valency of the iron ion. Hole 309 is labelled "P.ADD $C.HNO_3$+TRACE $NaBiO_3$. WARM.-CRIMSON LIQUID.-Mn." Thus if the precipitate is dissolved in concentrated nitric acid with a trace of sodium bismuthate, the presence of manganese will be indicated by the red or crimson colouration of the resulting liquid.

Analysis for Group IV Metals commences at hole 400 which is marked "L.PASS $H_2S$ THROUGH SOLUTION MADE ALKALINE WITH $NH_4OH$." The centrifuged liquid from this stage goes on to hole 500 and the precipitate to hole 401. Hole 401 is labelled "P.ADD D.HCl." These instructions are effected and the centrifuged liquid is placed at hole 402 and the precipitate to hole 405. Hole 402 is labelled "L.ADD XS. NaOH." The liquid from this stage is placed at hole 403 and the precipitate at hole 404. Hole 403 is labelled "L.PASS $H_2S$ THROUGH SOLUTION. WHITE PPT.Zn." Thus, if, on passing hydrogen sulphide gas through the liquid, a white precipitate is formed, then zinc is present. Hole 404 is labelled "P.ADD $C.HNO_3$+TRACE $NaBiO_3$. WARM. CRIMSON LIQUID Mn." Thus if concentrated nitric acid and a trace of sodium bismuthate is added to the precipitate and a red or crimson colour results therefrom, manganese is present. Hole 405 is labelled "P.ADD C.HCl+TRACE $KClO_3$.DILUTE." Thus concentrated hydrochloric acid and a trace of sodium chlorate are added to the precipitate, the resulting liquid diluted and divided into two portions which are placed at holes 406 and 407 for determination of the presence of nickel and cobalt respectively. Hole 406 is labelled "L.ADD' $NH_4OH$ XS. +DIMETHYL GLYOXIME. RED PPT. Ni" and hole 407 is labelled "L.ADD α-NITROSO β-NAPHTHOL. RED-BROWN PPT. Co."

Investigation for Group V metals commences at hole 500 which is labelled "L.REDUCE VOLUME BY BOILING IN CRUCIBLE. ADD SOLID $(NH_4)_2CO_3$. WARM." The centrifuged liquid from this stage is placed at hole 600 and the residue goes on to hole 501.

Before the metal ions of Group V can be investigated properly, the presence of barium must be determined and if barium is present, these ions must be removed. Therefore, hole 501 is labelled "P.ADD HAc. AND HEAT. ADD 1 DROP $K_2CrO_4$ TO 1 DROP OF SOLUTION. IF YELLOW PPT, ADD $K_2CrO_4$ TO MAIN SOLUTION." The centrifuged precipitate is placed at hole 505 to confirm the presence of barium. Hole 505 is therefore labelled "P.FLAME TEST, GREEN COLOUR. Ba." The liquid goes to hole 502 which is labelled

"L.ADD $NH_4OH$ UNTIL ALKALINE +$(NH_4)_2SO_4$. BOIL."

The centrifuged liquid from this stage goes to hole 503 and the precipitate to hole 504. Hole 503 is labelled "L.ADD $(NH_4)_2C_2O_4$. WHITE PPT. Ca" and hole 504 is labelled "P.FLAME TEST. CRIMSON COLOUR.Sr."

The last group, Group VI, commences at hole 600. However, during the preparation, ammonium salts are decomposed and therefore determination for the ammonium anion is effected using some of the original solution. Therefore, hole 600 is labelled "L.EVAPORATE SOLUTION TO DRYNESS IN CRUCIBLE. ADD $C.HNO_3$ AND HEAT TO RED-HEAT. (IF NO RESIDUE, THEN Mg, Na, K ABSENT.) DISSOLVE ANY RESIDUE IN HAc." The liquid is then divided into three portions which are placed at holes 602, 603 and 604 which are generally labelled "TWO DROPS FROM MAIN SOLUTION TO BE PLACED IN EACH TUBE." Hole 602 is labelled "ADD 1 DROP MAGNESON REAGENT +2 DROPS NaOH.BLUE PPT.-Mg." Hole 603 is labelled "ADD 1 DROP MAGNESIUM URANYL ACETATE. YELLOW PPT.-Na." Hole 604 is labelled "ADD 1 DROP SODIUM COBALTINITRITE. YELLOW PPT.-K." For the detection of ammonium ion, a further hole 601 is provided, with the preliminary test holes 9, which is labelled "TEST FOR AMMONIA." Thus if some original solution is heated with sodium hydroxide and the vapour emitted tested with red litmus-paper and mercurous nitrate paper, if the litmus turns blue and the paper turns black, the ammonium anion is present.

It can be seen from the above description that test tubes containing material are labelled when placed in the relevant hole, so that a line of analysis can be discontinued, the test tubes left in position, and other things attended to without fear of losing track of the analysis nor of losing the samples or the samples' identity. Also the results of analysis are clearly shown so that at each stage, samples can be retained thus making it possible to repeat parts of the schedule to check results and, if the board is used by students, the instructor can see at a glance the results and state of progress of each student. Also, the fact that instructions are already marked on the board allows speedy analysis and also minimises the amount of apparatus on the work bench, as text books or schedules are not necessary. Furthermore, as each portion is only labelled with relevant information, complicated analysis can be undertaken by substantially unskilled operatives who would otherwise be confused by excess amounts of information.

As the top sheet 11 is only attached to the base-element 2 by press studs 12, it can be removed for student examination purposes, replaced when worn-out or damaged, or replaced by alternative top sheets for use in different schemes.

It will be understood from the foregoing that the present invention can be applied to any scheme of analysis and/or examination of material, which has a predetermined sequence of operations.

I claim:

1. An analytical step indicator board for indicating the stages reached in the investigation of substance according to a sequential scheme, comprising a substantially rigid member having a plurality of container-retainers, the container-retainers being arranged in a plurality of groups, the groups being divided off from each other by markings on the member each container-retainer being labelled, either by virtue of its position or by means of further markings on the member, to indicate a stage in the scheme; the arrangement being such that, in operation, when a container, containing substrate, is placed into the container-retainer corresponding to the stage in the scheme sequence that has been reached by the substrate the further markings on the member indicate the possible identity of the substrate and/or the further steps of the sequence necessary to reach the next stage in the scheme.

2. A board as claimed in claim 1 wherein the containers are semimicro test tubes and the container-retainers are of a size to support a semimicro test tube in a substantially upright position.

3. A board as claimed in claim 1 wherein the member is recessed to receive the containers.

4. A board as claimed in claim 1 wherein the member comprises a lower layer having means for supporting the containers and an upper layer bearing all the markings.

5. A board as claimed in claim 4 wherein the upper layer and the lower layer are separate and comprising means for securing the layers together.

6. A board as claimed in claim 5, wherein said means for securing the layers together comprises captive press-locking studs engaged in retaining means in the upper layer.

7. A board as claimed in claim 1 wherein the surface bearing the markings is coated with a light-transparent reagent-resistant protective layer.

8. A board as claimed in claim 7 wherein the protective layer is impervious to liquids.

9. An analytical step indicator board for indicating the stages reached in the investigation of substance to determine the identity of inorganic ions present, according to a sequential scheme, comprising a rigid base-element recessed to receive containers, a top sheet apertured in conformity with the recessed base-element, the top sheet having a surface-coating which is impervious and reagent-resistant, the base-element comprising keeper means and the top sheet comprising captive, press-locking studs adapted to engage with said keeper means, and the top sheet bearing on its upper surface markings which divide the top sheet into nine apertured sections, a first section being labelled for use in preliminary tests, a second section being labelled for use for tests for anions, a third section being labelled for use for confirmatory tests, and the remaining six sections each being labelled for use in the sequential analysis of a series of anion groups.

References Cited

UNITED STATES PATENTS

| | | | |
|---|---|---|---|
| 2,845,722 | 8/1958 | Midgley | 35—18 |
| 3,325,914 | 6/1967 | Bliss et al. | 35—18 |

MORRIS O. WOLK, Primary Examiner

R. M. REESE, Assistant Examiner

U.S. Cl. X.R.

35—18